US011001945B2

(12) United States Patent
Wetzel et al.

(10) Patent No.: US 11,001,945 B2
(45) Date of Patent: May 11, 2021

(54) PROCESS FOR CREATING A POLYMER FILAMENT SUITABLE FOR USE IN THREE-DIMENSIONAL PRINTING

(71) Applicant: U.S. Army Research Laboratory ATTN: RDRL-LOC-I, Adelphi, MD (US)

(72) Inventors: Eric D. Wetzel, Baltimore, MD (US); Larry R. Holmes, Jr., Peach Bottom, PA (US); Ricardo X. Rodriguez, Pembroke Pines, FL (US); Patrick M. Toal, Jr., Pearl River, NY (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1117 days.

(21) Appl. No.: 15/081,048

(22) Filed: Mar. 25, 2016

(65) Prior Publication Data
US 2016/0281267 A1    Sep. 29, 2016

Related U.S. Application Data

(60) Provisional application No. 62/139,313, filed on Mar. 27, 2015.

(51) Int. Cl.
*B29C 55/22*    (2006.01)
*B29C 63/18*    (2006.01)
(Continued)

(52) U.S. Cl.
CPC .............. *D01F 8/00* (2013.01); *B29C 65/565* (2013.01); *B29C 66/5221* (2013.01);
(Continued)

(58) Field of Classification Search
CPC ....... B29C 55/22; B29C 63/18; B29C 64/118; B29C 65/56; B29C 65/565;
(Continued)

(56) References Cited

U.S. PATENT DOCUMENTS 5,121,329 A    6/1992 Crump
5,362,427 A    11/1994 Mitchell, Jr.
(Continued)

OTHER PUBLICATIONS

Geoff Barton, Martijn A. van Eijkelenborg, Geoffrey Henry, Maryanne C.J. Large, and Joseph Zagari. "Fabrication of microstructured polymer optical fibers." Optical Fiber Technology. v10 p. 325-335. 2004.
(Continued)

*Primary Examiner* — Leo B Tentoni
(74) *Attorney, Agent, or Firm* — Christos S. Kyriakou

(57) ABSTRACT

A thermoplastic filament comprising multiple polymers of differing flow temperatures in a regular geometric arrangement, and a method for producing such a filament, are described. Because of the difference in flow temperatures, there exists a temperature range at which one polymer is mechanically stable while the other is flowable. This property is extremely useful for creating thermoplastic monofilament feedstock for three-dimensionally printed parts, wherein the mechanically stable polymer enables geometric stability while the flowable polymer can fill gaps and provide strong bonding and homogenization between deposited material lines and layers. These multimaterial filaments can be produced via thermal drawing from a thermoplastic preform, which itself can be three-dimensionally printed. Furthermore, the preform can be printed with precisely controlled and complex geometries, enabling the creation of monofilament and fiber with unique decorative or functional properties.

32 Claims, 12 Drawing Sheets

(51) Int. Cl.
| | |
|---|---|
| B32B 1/08 | (2006.01) |
| B33Y 10/00 | (2015.01) |
| D01D 5/08 | (2006.01) |
| D01D 5/24 | (2006.01) |
| D01D 5/253 | (2006.01) |
| D01D 5/32 | (2006.01) |
| D01D 5/34 | (2006.01) |
| D01F 8/02 | (2006.01) |
| D01F 8/04 | (2006.01) |
| D01F 8/06 | (2006.01) |
| D01F 8/10 | (2006.01) |
| D01F 8/12 | (2006.01) |
| D01F 8/14 | (2006.01) |
| D01F 8/16 | (2006.01) |
| D01F 8/18 | (2006.01) |
| D02J 1/22 | (2006.01) |
| D01F 8/00 | (2006.01) |
| C03B 37/028 | (2006.01) |
| B33Y 70/00 | (2020.01) |
| C03B 37/027 | (2006.01) |
| D01D 5/30 | (2006.01) |
| G02B 6/00 | (2006.01) |
| C03B 19/00 | (2006.01) |
| G02B 6/02 | (2006.01) |
| B29C 65/00 | (2006.01) |
| B29D 11/00 | (2006.01) |
| B29C 65/56 | (2006.01) |
| B29C 64/118 | (2017.01) |
| B29L 31/00 | (2006.01) |
| B29L 11/00 | (2006.01) |

(52) U.S. Cl.
CPC .......... *B29C 66/5241* (2013.01); *B29C 66/53* (2013.01); *B29C 66/61* (2013.01); *B29D 11/00663* (2013.01); *B29D 11/00701* (2013.01); *B29D 11/00721* (2013.01); *B33Y 70/00* (2014.12); *C03B 19/00* (2013.01); *C03B 37/027* (2013.01); *C03B 37/028* (2013.01); *D01D 5/30* (2013.01); *G02B 6/00* (2013.01); *G02B 6/02033* (2013.01); *G02B 6/02314* (2013.01); *B29C 64/118* (2017.08); *B29L 2011/0075* (2013.01); *B29L 2031/731* (2013.01); *C03B 2201/06* (2013.01); *C03B 2201/32* (2013.01); *C03B 2201/70* (2013.01); *C03B 2201/86* (2013.01); *D10B 2321/08* (2013.01); *D10B 2321/10* (2013.01); *D10B 2331/04* (2013.01); *D10B 2401/20* (2013.01)

(58) Field of Classification Search
CPC . B29C 66/5221; B29C 66/5241; B29C 66/53; B29C 66/51; B29D 11/00663; B29D 11/00701; B29D 11/00721; B29L 2011/0075; B29L 2031/731; B32B 1/08; B33Y 10/00; D01D 5/08; D01D 5/24; D01D 5/253; D01D 5/30; D01D 5/32; D01D 5/34; D01F 8/00; D01F 8/02; D01F 8/04; D01F 8/06; D01F 8/10; D01F 8/12; D01F 8/14; D01F 8/16; D01F 8/18; D02J 1/22; D10B 2401/20; G02B 6/02033
USPC ..... 264/1.24, 1.28, 1.7, 2.7, 171.12, 172.12, 264/172.15, 172.17, 172.18, 210.2, 210.8, 264/288.4, 290.5, 290.7, 308; 156/167, 156/180, 196, 198, 212, 213, 229, 293, 156/294; 29/419.1
See application file for complete search history.

(56) References Cited

U.S. PATENT DOCUMENTS

| | | | |
|---|---|---|---|
| 7,150,616 B2 | 12/2006 | Haynes et al. | |
| 2009/0003834 A1* | 1/2009 | Sato | B29D 11/00663 264/1.24 X |

OTHER PUBLICATIONS

Hart, S.D., Maskaly, G.R., Temelkuran, B., Prideaux, P., Joannopoulos, J.D., Fink, Y., "External Reflection from Omnidirectional Dielectric Mirror Fibers," Science 296, 510-513, Apr. 2002.
Temelkuran, B., Hart, S.D., Benoit, G., Joannopoulos, J.D., Fink, Y., "Wavelength Scalable Optical Fibers for CO2 Laser Transmission," Nature 420, 650-653, Dec. 2002.
Bayindir, M., Sorin, F., Hart, S., Shapira, O., Joannopoulos, J.D., Fink, Y., "Metal-Insulator Semiconductor Optoelectronic Fibres," Nature, 431, 826-829, Oct. 2004.
Bayindir, M., Shapira, O., Saygin-Hinczewski , D., Viens, J., Abouraddy, A.F., Joannopoulos, J.D., Fink, Y., "Integrated Fibers for Self Monitored Optical Transport," Nature Materials, 4, 820-824, Oct. 2005.
Abouraddy, A. F., Bayindir, M., Benoit, G., Hart, S. D., Kuriki, K., Orf, N., Shapira, O., Sorin, F., Temelkuran, B., Fink, Y., "Towards Multimaterial Multifunctional Fibres that See, Hear, Sense and Communicate," (invited review paper) Nature Materials 6, No. 5, 336-347, May 2007.
Stolyarov, A.M., Wei, L., Shapira, O., Sorin, F., Chua S.L., Joannopoulos, J.D., Fink, Y., "Microfluidic directional emission control of an azimuthally polarized radial fibre laser," Nature Photonics, 4, 4, 229-233, Apr. 2012.
Alexander Gumennik, Alexander M. Stolyarov, Brent R. Schell, Chong Hou, Guillaume Lestoquoy, Fabien Sorin, William McDaniel, Aimee Rose, John D. Joannopoulos, and Yoel Fink. "All-in-fiber chemical sensing." Advanced Materials v24 n45 p. 6005-6009. 2012.
Guillaume Lestoquoy, Noemie Chocat, Zheng Wang, John D. Joannopoulos, and Yoel Fink. "Fabrication and characterization of thermally drawn fiber capacitors." Appl. Phys. Lett. v102 n152908. 2013.
Personal communication, Eric D. Wetzel visit to Prof. Yoel Fink at MIT-ISN. Cambridge, MA. Oct. 29, 2014.
http://www.raumedic.com/uploads/pics/mehrlumenschlauch.jpg, (Undated).
S. C. Xue, M. C. J. Large, G. W. Barton, R. I. Tanner, L. Poladian, and R. Lwin. "Role of material properties and drawing conditions in the fabrication of microstructured optical fibers." J. Lightwave Tech., v24 n2 p. 853-860. 2006.

* cited by examiner

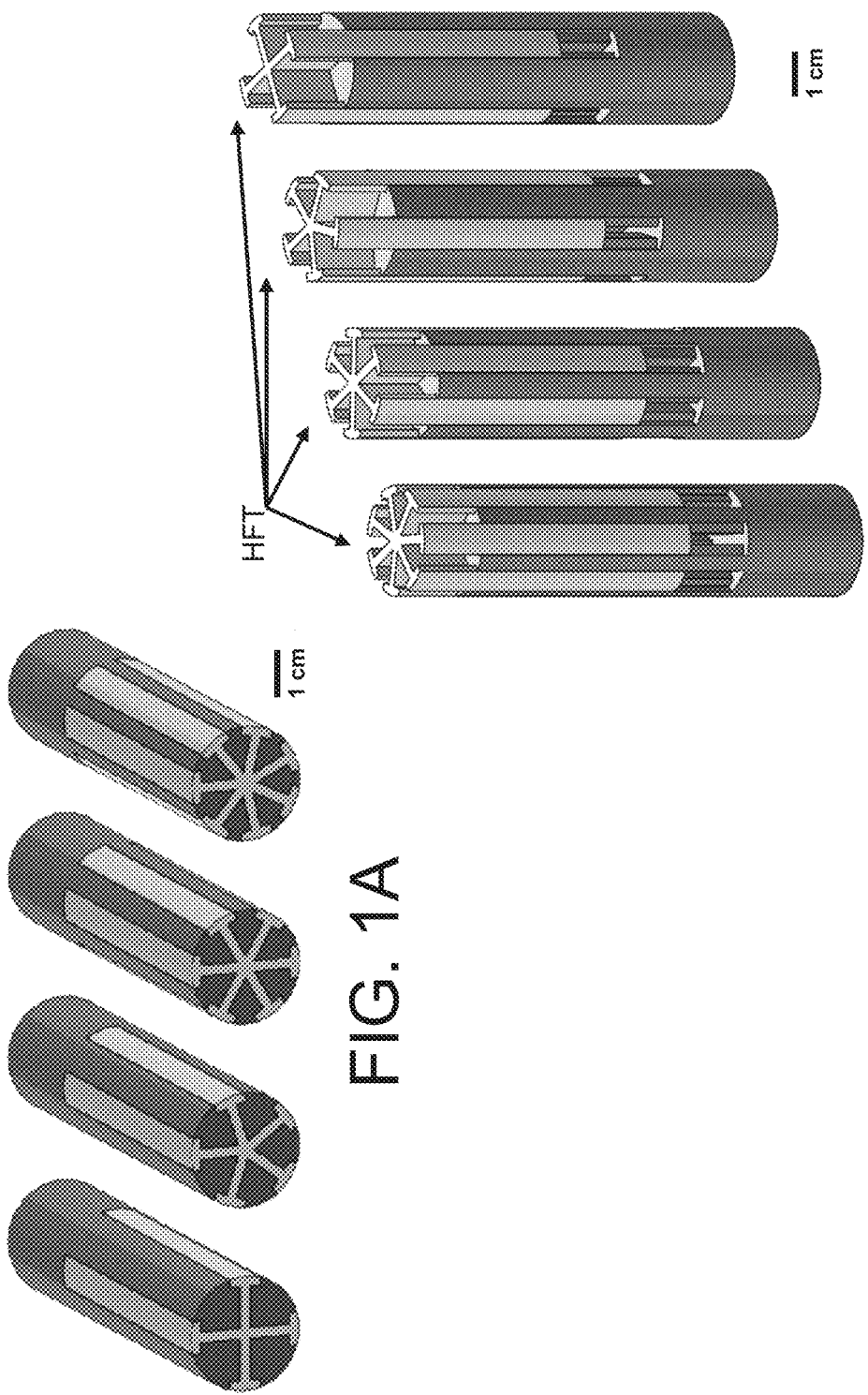

PROCESS FOR CREATING A POLYMER FILAMENT SUITABLE FOR USE IN THREE-DIMENSIONAL PRINTING

CROSS-REFERENCE TO RELATED APPLICATIONS

This application claims priority to and the benefit of U.S. Provisional Application No. 62/139,313, titled "Geometrically Regular, Multi-Material Polymer Filament for Three-Dimensional Printing" filed on Mar. 27, 2015 which is hereby incorporated by reference herein including all attachments and papers filed with U.S. Provisional Application No. 62/139,313.

GOVERNMENT INTEREST

The invention described herein may be manufactured, used, and licensed by or for the United States Government.

FIELD

The present invention relates generally to the field of materials. More specifically, materials and devices are provided for use in production of complex fibers for many applications such as three-dimensional printing methods and systems, optical fibers, electronic fibers, or microfluidic fibers, among other applications. In particular aspects, materials and material structures are provided that provide superior capabilities in formation of complex fibers.

BACKGROUND

Three-dimensional printing technology, also referred to as additive manufacturing technology, creates physical models from computational models, usually layer upon layer, unlike traditional subtractive manufacturing technologies. Additive manufacturing processes that create physical models by melt-depositing thermoplastic filaments can be referred to as fused filament fabrication (FFF), although other terms such as fused deposition modeling and plastic jet printing are also used. Additive manufacturing processes are known in the art, for example as illustrated and described in U.S. Pat. No. 5,121,329.

It is desirable for FFF parts to accurately reproduce the precise geometry of the source computational model, while providing high strength and stiffness and, in some cases, other functionalities such as electrical conductivity or optical clarity. Thermoplastics exhibit viscoelastic thermal softening, in which elastic stiffness and viscosity reduce gradually as temperature is increased. It is desirable to execute FFF at lower temperatures, in which the thermoplastic is less flowable and more mechanically stable, in order to accurately create geometries while minimizing errors due to part sag, shrinkage, or warpage. However, it is also desirable to execute FFF at higher temperature, in which the thermoplastic has high flow and forms strong thermoplastic welds between print lines and layers, to increase the mechanical stiffness and strength of the part while reducing porosity and surface roughness. Since both high flow and high mechanical stability conditions cannot be met simultaneously with a single polymer, FFF is typically executed at a compromised temperature at which weldlines partially fuse, providing a moderate level of mechanical robustness, and at which there is a moderate but acceptable level of geometric sag, shrinkage, and/or warpage.

Some attempts have been made to create FFF feedstock by blending two thermoplastics with different melt temperatures, such as by feeding both polymers into an extruder. The resulting thermoplastic monofilament contains two polymers of differing flow temperatures, but the polymers are mixed randomly into a non-regular cross-sectional arrangement. This blended material typically exhibits flow and sag characteristics equivalent to an average of the properties of the individual polymer phases, and does not provide any distinct advantages over conventional FFF monofilament feedstock. For blended filaments with a majority of low flow-temperature polymer, heating the filament leads to bulk softening of the filament, since the random and likely disconnected arrangement of the higher flow-temperature polymer does not provide a means of efficiently supporting mechanical load. Similarly, blended filaments with a majority of high flow-temperature polymer are unlikely to exhibit good flow and bonding at lower temperatures, as much of the low flow-temperature polymer is likely to be trapped within the higher flow-temperature polymer.

In addition to compromises in mechanical and geometric characteristics, insufficient weldline fusing also compromises functional properties of conventional FFF parts. For example, FFF from optically clear feedstock leads to white or translucent parts due to scattering from trapped air-filled voids. Heating the part can be used to flow the polymer, eliminating the voids and creating a transparent part, but geometric accuracy will be lost. Similarly, electrically conductive thermoplastic feedstock is available that is composed of conductive filler, such as carbon black or metal filings, dispersed in a conventional thermoplastic. As-printed weldlines are unlikely to have electrical conductivity as high as the original feedstock, because the conductive filler cannot fully disperse and make contact across the weld line. Heating the part can reduce or eliminate the weldlines, potentially increasing filler-to-filler contact and therefore electrical conductivity, but geometric accuracy will be lost.

As such, a new approach is needed to enable the fabrication of FFF parts with high functional properties and high geometric stability, including approaches in which post-anneals (subjecting the part to temperatures greater than room temperature for a finite period of time) may be used to increase functional properties without compromising geometric accuracy.

Additionally, there is a need to create monofilaments and fibers with complex and tailorable cross-sectional arrangements. For example, optically waveguiding or diffracting fibers can be created with precise arrangements of materials with varying indices of refraction, and materials with scattering, reflective, or absorbing properties. Microfluidic fibers, such as would be used for example in vascularly accessed medical procedures, are needed in which multiple flow cavities are contained within a single fiber. Creating fibers with images, text, symbols, logos, or a barcode microscopically incorporated into the fiber cross-section could be useful for anti-counterfeiting, tagging, identification, tracking, or beautification of specialized goods and materials.

Many of these complex cross-section fibers could conceivably be fabricated by forcing molten polymer through a complex metal die via a conventional extrusion process. However, such extrusion dies are complex and expensive to design and fabricate, and require long lead times and specialized skill to create and implement. Combining multiple materials, in particular, via co-extrusion requires multiple extruders and very complex die arrangements that can dramatically increase manufacturing costs. An example of a complex die for extruding bicomponent fibers illustrated and described in U.S. Pat. No. 7,150,616. It is rarely economical to co-extrude more than three different polymers, placing a further limitation on this approach. An approach that would allow fabrication of complex cross-section, multi-material fibers in a matter of hours, with relatively modest skills and facilities, and a very diverse range of highly tailorable geometry and material combinations, would be of great industrial and technological importance.

As such, there is a need for new materials suitable for use in additive manufacturing processes that allow for improved weldline performance and reduction in the need for post-manufacturing processes thereby improving geometric accuracy, as well as providing complex, cross section fibers that are capable of maintaining geometrical arrangements.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

According to one object of the invention, provided are preforms or filaments that are formed of one or more materials such as but not limited to a thermoplastic, glass, metal, edible material, or other material. In some aspects, a filament or preform contains two or more polymers of differing flow temperature. The two or more materials are optionally in a regular geometric arrangement within the filament or preform cross-section. This arrangement results in a structure optionally with a processing temperature window in which the lower flow temperature (LFT) polymer flows in order to fill voids and form strong weld lines, while the higher flow temperature (HFT) polymer remains mechanically stable to retain dimensional stability. By printing or annealing FFF parts within this processing window, parts with high mechanical and functional properties, as well as reduced surface roughness that also maintain geometric accuracy can be produced.

According to another object of the invention, provided are preforms or filaments with two or more polymers, metals, glasses or other materials of differing optical, electrical or other properties, arranged with geometric precision so that patterns, images, text, symbols, logos, or barcodes are microscopically encoded in the filament or preform cross-section, or to create filaments or preforms with unique optical waveguiding properties.

According to another object of the invention, provided is the use of FFF for creating a filament or preform that can be thermally drawn to create a smaller filament with complex geometric arrangement.

BRIEF DESCRIPTION OF THE DRAWINGS

FIG. 1A illustrates four example of regular geometric arrangements of two differing types of polymers as illustrated and differentiated by shading with the white material illustrating the high flow temperature (HFT) polymer and the darker, gray material illustrating the low flow temperature (LFT) polymer;

FIG. 1B illustrates regular geometric arrangements of two differing types of polymers as illustrated and differentiated by shading with the white material illustrating the high flow temperature polymer and the gray material illustrating the low flow temperature polymer where the HFT material is depicted as being slid to a final position interlocked with the LFT material;

DETAILED DESCRIPTION

Figure 1C:
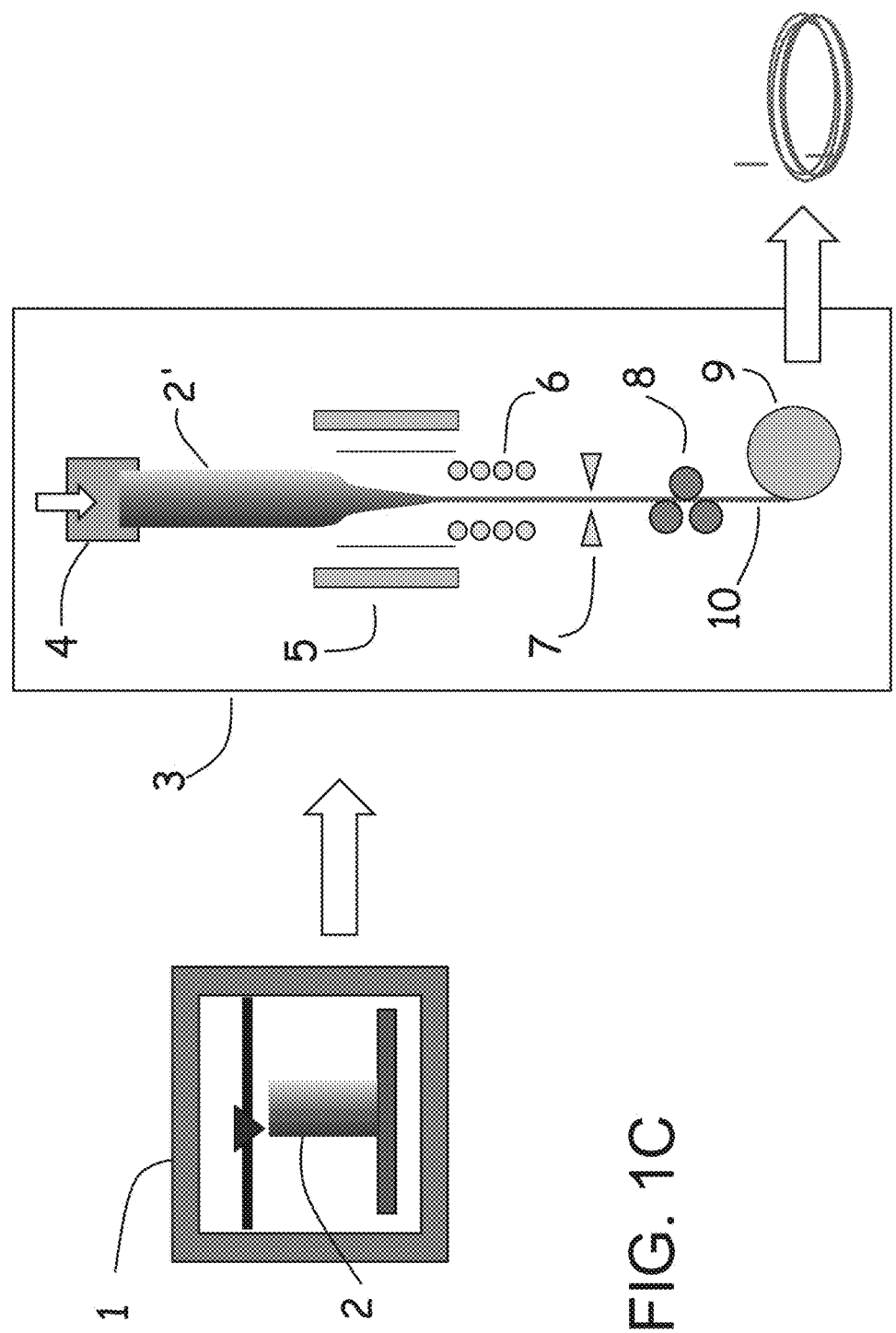
FIG. 1C illustrates an exemplary production method for a filament whereby a preform, optionally made by a three dimensional printing process, is drawn to a filament in a draw tower.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, parameters and/or sections, these elements, components, regions, layers, parameters, and/or sections should not be limited by these terms. These terms are only used to distinguish one element, component, region, layer, parameter, or section from another element, component, region, layer, parameter, or section. Thus, "a first element," "component," "region," "layer," "parameter," or "section" discussed below could be termed a second (or other) element, component, region, layer, parameter, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein the term "regular geometric arrangement" is defined as a constant or defined pattern or patterns with specific and defined spaces between individual instances where the overall geometric arrangement has a repeatability of geometric shape, size, or orientation of one element relative to another element on the same or different device recurring at a fixed interval of distance.

As used herein, the term "periodic geometric arrangement is a regular geometric arrangement with a specific periodicity of an element shape, size, or other characteristic appearing and/or recurring at a fixed interval or intervals.

As used herein the term "flow temperature" is defined as any characteristic polymer temperature, such as a softening (i.e. $T_g$, glass transition) or melting point that can be used to compare the thermal properties of different polymers and which in part determines appropriate drawing and printing process conditions for a given polymer system.

As used herein the term "physically associated" is defined as in physical contact throughout at least a portion of one element relative to a second element.

As used herein the term "filament" is an elongated material formed by the process of drawing, such as thermal drawing, from a preform to a cross sectional dimension that is less than the corresponding cross sectional dimension of the preform.

As used herein the term "preform" is a three dimensional body of two or more materials with differing mechanical, physical, optical, electrical, or other desired properties arranged in a regular or irregular fashion and suitably dimensioned so as to allow the preform to be drawn into the form of a filament.

Provided herein are multi-component materials that are in the form of a preform or a filament useful as an end product or for further processing to form an article such as by methods of three dimensional printing. By combining two or more materials that differ in one or more properties into the configuration of a preform, the geometric arrangement of the preform is maintained throughout a drawing process so as to produce a filament with desired uses, configurations, or properties that are not easily obtainable by other filament manufacturing methods. A filament as provided herein can be used as an end product itself, can be further drawn into a smaller cross sectional dimension for other uses or for the manufacture of an article such as by three dimensional printing or other process. A filament has a stable cross sectional interrelationship between two or more materials that are included in the filament. Such cross sectional stability is achieved in some aspects by creation of a larger preform with the desired interrelationship and drawing the preform into the form of a filament by a process such as thermal drawing. As such, the interrelationships provided between materials as described herein for a filament are also provided for the description of a preform with the exception of physical dimensions thereof which are larger in a preform. Much of the description is directed to filaments for use in three dimensional printing, but it is equally appreciated that such filaments are suitable for many other uses and in many other configurations as is appreciated by one of ordinary skill in the art in view of the description provided herein.

In a first aspect, provided is a filament optionally suitable for use in three dimensional printing including a first filament material and a second filament material, the first filament material and the second filament material physically associated in a regular or other predetermined geometric arrangement.

In some aspects, a first filament material or a second filament material are a thermoplastic polymer. Optionally, both a first filament material and a second filament material are differing thermoplastic polymer in which a flow temperature of the first thermoplastic polymer is at least 10 degrees Celsius higher than a flow temperature of the second thermoplastic polymer. A filament thusly composed is suitable as a material source for additive manufacturing processes that create physical models by melt-depositing thermoplastic filaments such as fused filament fabrication (FFF) methods. The filaments provided have the ability to improve association between one layer of printed material and an adjacent layer of printed material, by depositing filament such that the lower flow temperature (LFT) polymer flows in order to fill voids and form strong weld lines, while simultaneously retaining dimensional accuracy due to the mechanical stability of the higher flow temperature (HFT) polymer. This way the regular geometric arrangement of the HFT polymer stabilizes the localization of the LFT polymer to promote geometric confinement of the LFT polymer and overall geometric stability of the resulting article.

In some aspects, the filament includes two thermoplastic polymer materials that differ in flow temperature by 10° C. or greater. It has been found that in some FFF processes, the upper limit of flow temperature differences should be employed. As such, optionally, the two polymer materials differ in flow temperature by 10° C. to 150° C., optionally 10° C. to 50° C., or any value or range therebetween. Optionally, the two polymer materials differ in flow temperature by 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50° C. Optionally, the two polymer materials differ in flow temperature by 10° C. to 30° C. or any value or range therebetween. The presence of the tailored differing flow temperatures allows for improved weldline strength and geometric stability of the printed article.

A first thermoplastic polymer may be made of the same or differing material(s) as a second thermoplastic polymer as long as the flow temperatures of the two materials differ by at least 10° C. A first or second thermoplastic polymer optionally includes one or more of the following materials: acrylonitrilebutadienestyrene (ABS); high density polyethylene (HDPE); low density polyethylene (LDPE); polyamide (Nylon); polyamide imide (PAI); polyarylate (PAR); polyaryletherketone (PAEK); polybutylene terephthalate (PBT); polycarbonate (PC); polyester; polyether sulfone (PES); polyetherketoneketone (PEKK); polyetheretherketone (PEEK or PK); polyetherimide (PEI, ULTEM); polyetherketone (PEK); polyetherketonetherketoneketone (PEKEKK); polyethlyene (PE); polyethylene terephthalate (PET); polyimide (PI); polylactic acid (PLA); polymethyl methacrylate (PMMA); polyoxymethylene (POM); polyphenylene oxide (PPO); polyphenylene sulfide (PPS); polyphenylsulfone (PPSU); polyphthalamide (PPA); polyphthalate carbonate (PPC); polyproplyene (PP); polystyrene (PS); polysulfone (PSF); polyurethane (PU); polyvinyl chloride (PVC); polyvinylidene fluoride (PVDF); styrene acrylonitrile (SAN); styrene maleic anhydride (SMA); ultrahigh molecular weight polyethylene (UHMWPE); other thermoplastics, thermoplastic polymers and melt processable polymers.

In some aspects, a thermoplastic polymer is electrically conductive. Known electrically conductive thermoplastic polymers may be used. The electrically conductive material may be an inherently conductive polymer e.g. polyacetylene or polypyrrole, or a polymer filled with electrically conductive filler to a level giving acceptable conductivity. In some aspects, the polymer material itself is not electrically conductive such as but not limited to polyurethanes, silicon rubber, polysulphides, or polyamides, but are combined with one or more electrically conductive fillers to produce an electrically conductive polymer material. The filler may be any solid particulate material having sufficiently high electrical conductivity and having chemical compatibility with the matrix polymer. Illustrative examples include the group of metals commonly used to conduct electricity, for example, aluminum, copper, nickel, silver, gold, tin/lead alloys, etc. or from the group of conductive carbons, for example, carbon black, graphite, etc., or, optionally, from the class consisting of acetylene black, for example, Shawinigan acetylene black, UCET acetylene black, etc.

In some aspects, a filament material includes one or more optical properties. Illustrative optical properties include optical transparency, translucency, fluorescence, phosphorescence, luminescence, or other optical property. Optically transparent is defined as allowing light to pass through the material without being scattered, e.g. light passing through the material follows Snell's law. Optically translucent materials allow light to pass through the material, but some degree of scattering occurs. Illustrative polymeric materials that may be formed to allow light to pass through include polycarbonate, PMMA, PVDF, polypropylene, fluorinated ethylene propylene, polymethylpentene, among others. Other optically transparent materials include glass or other known suitable transparent material. Optically transparent, translucent, fluorescent, phosphorescent or other optical property containing filament materials are optionally used to form a filament in the form of an optical waveguide where light is transmissible along the length of the filament. In some aspects, materials of contrasting index of refraction can be combined to create optical waveguides such as optical fiber.

An optical property is optionally color, optionally visible color where the filament material is optically reflective to light having a wavelength in the visible spectrum—i.e. 390 nm to 700 nm. Optionally, an optical property is color in the UV or IR ranges.

Thermoplastic polymers are obtainable commercially from many sources known in the art or are formed in situ. Illustrative commercial sources include Star Thermoplastics (Broadview, Ill.) among others.

In some aspects, a filament material is a scavengable scaffold material that is capable of being selectively degraded when combined with a second or other filament material that is not a scavengable scaffold material. Such scavengable materials are known in the art and may be degraded by either thermal, biological, or chemical methods. Optionally, a scavengable scaffold material is a biodegradable plastic, illustratively polyhydroxyalkanoates (such as poly-3-hydroxybutyrate (PHB), polyhydroxyvalerate (PHV) and polyhydroxyhexanoate (PHH)), polylactic acid (PLA), Polybutylene succinate (PBS), polycaprolactone (PCL), polyanhydrides, polyvinyl alcohol, among others.

In some aspects a filament material is a glass. Illustrative examples of a glass include but are not limited to glasses that include silica, alumina, chalcogenide, or phosphate.

In some aspects, a filament material is or contains a metal. Illustrative examples of a metal include but are not limited to a eutectic metal, metal solder, metal braze, copper, aluminum, steel, stainless steel, titanium, semi-conducting metal, and bulk metallic glass.

In some aspects, a filament material includes an edible body that includes one or more human or animal edible materials. Illustrative non-limiting examples of an edible body include a sugar, pasta, dough, vegetable paste, fruit paste, food paste, and a pharmaceutical.

In some aspects, two filament materials are combined in a single filament, but a filament is not necessarily limited to two thermoplastic polymers. Optionally, 3, 4, 5, 6, or more filament materials are combined. Optionally, the geometric arrangement of at least one or more of the filament materials follows a regular or other predetermined geometric arrangement. Optionally, and at least two of the filament materials have a flow temperature that differs by 10° C. or more.

Optionally, a filament includes at least two compositionally different filament materials where at least a portion of the compositionally different materials are present on the outer surface of the filament. Compositionally different polymers are optionally of different chemical composition, optionally including differing types of chemical crosslinks, formed of different precursor materials (i.e. differing length, type, etc.), including differing additives, or of differing linkages. In one illustrative aspect, a first thermoplastic polymer includes poly(methyl methacrylate) (PMMA), and a second thermoplastic polymer includes acrylonitrile butadiene styrene (ABS). Other combinations are readily formed.

A first filament material and a second filament material may be physically associated, optionally in an interlocking manner, optionally in a side by side manner in the longitudinal direction, or other so as to form a single filament. A filament is optionally in the form of a cylinder, an rectangular prism, elongated prism structure with a cross sectional area in the shape of a circle, square, rectangle, trapezoid, hexagon, pentagon, other polygon as desired, or an irregular outer shape of the cross sectional area. A cross sectional shape optionally is continuous throughout the length of a filament. In some aspects, a cross sectional shape varies along the length of a filament. Variation of a cross sectional shape is optionally non-random so as to form a useful shape. One illustrative example is a circular cross sectional shape along much of a filament length and terminating in a square cross sectional shape so as to be removably holdable in a filament holder for use in manufacturing processes. A cross sectional shape optionally varies non-randomly such as by design, or by regular and mathematically describable changes.

A filament optionally has a length that is greater than a cross sectional dimension so as to form an elongated shape with a longitudinal dimension.

A filament includes a first thermoplastic polymer that is optionally a high flow temperature thermoplastic polymer (HFT) and a second thermoplastic polymer that is optionally a low flow temperature thermoplastic polymer (LFT). Here the terms "low" and "high" are terms relative to the flow temperature of the other polymer where a LFT polymer has a lower flow temperature than and HFT polymer, and an HFT polymer has a higher flow temperature than a LFT polymer. The HFT and LFT polymers are optionally in a regular geometric arrangement, optionally extending in a longitudinal direction. Illustratively, a regular geometric arrangement is observed when viewing a filament by cross section.

As an illustration, FIG. 1 depicts preforms for creating two-polymer monofilaments illustrating how the materials for the creation of a filament can be arranged and produced. A preform that is thermally drawn to a filament is optionally suitable as feedstock for a three-dimensional printer where a filament is further reduced in cross section during the printing process. As illustrated in FIG. 1A the gray LFT polymer and white HFT polymer are in a regular arrangement with a number of design features. First, the outer faces of the preform show alternating LFT and HFT material in approximately equal proportion. This feature ensures that, when used for FFF parts, there exists opportunity for continuous contact of LFT and HFT polymers throughout the entirety of the printed part, leading to a percolated, mutually interpenetrating geometry. A second feature is that the LFT polymer is interlocked with the HFT polymer so that that LFT polymer is geometrically confined within the preform. This design allows the preform to be drawn to a filament at a temperature where the HFT polymer can be viscously drawn while the LFT polymer is at a much lower viscosity. Without such confinement within the HFT polymer, the LFT polymer would be at such a low viscosity that it would likely break up or separate during drawing. A final feature of the preform is that the HFT polymer is a single continuous body in the preform, while the LFT polymer is arranged as discrete inserts. Because the HFT polymer is continuous, it provides mechanical stability during thermal drawing of the preform and during additive manufacturing of FFF parts. If, instead, the HFT polymer phase was not continuous, the monofilament produced by thermal drawing would likely be less stable mechanically.

In one exemplary aspect illustrated in FIG. 1B, the HFT and LFT polymer components are each individually printed (i.e. made) separately and then manually (or by machine) combined into a single, interlocking preform. The base of the preform optionally also includes geometric features such as a tapped hole for mounting into a draw tower. Various degrees of symmetry for the HFT and LFT material may be employed similar to FIG. 1A, e.g. 3-way, 4-way, 5-way, 6-way, and 7-way, can be employed. In the exemplary aspects of FIGS. 1A and B, the LFT polymer is acrylonitrile butadiene styrene (ABS), with a glass transition temperature ($T_g$) of approximately 105° C., and the HFT polymer is polycarbonate (PC), with a $T_g$ of approximately 147° C.

In some aspects, a geometric arrangement is a regular geometric arrangement. In some aspect, the geometric arrangement radially symmetric or symmetric about the long axis of the fiber. A "regular" arrangement includes any geometry which is spatially designed, orderly, and deterministically arranged. Regular geometries include, but are not limited to, geometric patterns, images, text, symbols, logos, or barcodes. Geometries that are not "regular" include random mixtures, and disordered material combinations with significant spatial variations in phase size, shape, and distribution, optionally so as not to form a human or machine cognizable image or unable to convey meaning or data. Illustrative examples of regular arrangements are optionally where the first filament material is oriented, shaped, and positioned in regular, repeating intervals around the circumference of a preform. Such an arrangement is also a periodic geometric arrangement, where a periodic geometric arrangement is defined as a regularly repeating arrangement of one filament material to another filament material in shape, orientation, and location within the filament or a preform.

The first filament material, the second filament material, or both are optionally a single continuous body through a filament length, meaning that the filament material is continually present from one end of a filament to another. Optionally, the single continuous body polymer is an HFT polymer. Optionally, an LFT polymer is not continuous throughout a filament length. Optionally, an LFT polymer has a length that is less than the full length of the filament.

A filament optionally includes a geometry where a HFT filament material at least partially confines a LFT filament material so that the LFT filament material is restricted from release from the filament structure. An exemplary arrangement of such a construction is illustrated in FIGS. 1A and B where a white HFT polymer material is shaped to form "T" shaped extensions that prevent the release of the LFT polymer from the overall structure in a direction other than a longitudinal direction. Any shape of an HFT filament material may be suitable for restricting release of the LFT filament material, illustrative, L shape, barbs, curves, or other shape.

A regular geometric arrangement is optionally in the form of human or machine recognizable text, a symbol, pattern, or barcode. As the preform may be made by FFF processes, and the resulting filament may be made by thermal drawing processes, the shapes of the geometric arrangement are not limited and can be readily tailored to any desired shape. One innovative aspect of the filaments is that the shapes can be made in a larger form such as in the form of a preform that is readily made into any desirable shape, and are able to be drawn to a much smaller size in cross sectional dimension while still maintaining the regular geometric pattern and the overall shape and arrangement of the polymers in the material. Thus, a barcode, text, or other geometric shape is able to be greatly reduced in size from an original preform size. A preform is optionally of larger cross sectional dimension relative to a final filament that is used for FFF processes. Optionally, a preform is between 1.1 and 100 times the cross sectional dimension.

As such, also provided are preforms. A preform in some aspects is useable as a source for feedstock in devices for FFF manufacturing or other. A preform optionally has a cross sectional dimension of 1-1000 mm, or any value or range therebetween, optionally 5-50 mm, optionally, 10-30 mm. A preform is drawable into a final filament with a smaller cross sectional dimension relative to the preform where the filament has substantially the same geometrical arrangement in cross section as the preform. A filament optionally has a cross sectional dimension, that is 0.01-100 mm, or any value or range therebetween. If the filament is to be used as a feedstock for FFF manufacturing devices, it optionally has a cross sectional dimension of 0.5-5.0 mm, optionally, 1-3 mm. A cross sectional dimension is a dimension perpendicular to a longitudinal dimension of a filament. Optionally, a cross sectional dimension is a diameter.

A preform is optionally made by an additive manufacturing process in which material is selectively dispensed through a nozzle or orifice. In general these systems consist of a three or more axis, computer controlled gantry, deposition mechanism, feedstock supply and heated build platform. Depending on the material system that is desired for a final part, the deposition mechanism can vary. The thermoplastic feedstock that is utilized in this art is in the form of a continuous filament with a consistent diameter that is typically between 1 mm to 3 mm. For processing of these types of thermoplastic filaments, a rudimentary deposition system consists of a drive train, heating element, and extrusion nozzle. The drive train consists of a motor or motors and a system of gears that feeds the thermoplastic filament through the rest of the process. A heating element creates a zone of elevated temperature that increases the flowability of the thermoplastic as it is forced through the system by the drive train. The thermoplastic continues through an extrusion nozzle that generally has a decreasing diameter along its length. The change in diameter of the extrusion nozzle causes the diameter of the thermoplastic to decrease. In this form of the deposition process the filament that exits the extrusion nozzle has been reduced to a diameter range of 0.05 mm to 0.5 mm. The deposition system can be mounted onto a gantry system that supports the deposition system above a base component. The gantry system allows the deposition system to move relative to the base component along "X," "Y," and "Z" axes. The movement is conducted in a preset order allowing for the fabrication of a three dimensional structure. The order is generally computer driven based on computer aided design (CAD) software which generates controlled motion paths for the gantry system. The extruded filament is deposited onto the base component line by line to create a layer that is representative of the cross section of the desired three dimensional part. Another layer is then deposited on top of the first. This iterative process continues until the part is completed.

When the three dimensional part being fabricated has geometric complexities that require support during build (overhangs, steep angles, or encapsulated volumes) two deposition mechanisms may be used: 1) a deposition system that deposits the modeling material or the product material; 2) a deposition system that deposits a support material (eventually to be washed out, machined off or broken off) to temporarily support said geometric complexities. The heating elements, of at least one deposition mechanism, may be capable of achieving temperatures such that a range of the filament materials with different softening temperatures (i.e. glass transitions temperatures) can be processed through the extrusion nozzle. The diameter of the extrusion nozzle tip's orifice is recommended to be approximately 0.01" (0.254 mm). However, orifice dimensions are arbitrary and only restricted by the desired fidelity of the preform to be fabricated, granted it can be drawn into filament.

A filament or preform is optionally formed by printing the shape in total or in parts. For example, a preform or filament is optionally itself formed by FFF printing processes. In some aspects, the HFT filament material is formed or printed separately from the LFT material and then the two materials are manually or mechanically slid together for form a single filament or preform. In such aspects, the geometrical shape and dimensions of the HFT material and the LFT material are compatible such that the two materials may be associated by a physical interaction such that the two materials do not disassociate upon handling. Optionally, the HFT material and the LFT material are printed simultaneously with the geometric arrangement between the materials formed in situ.

In some aspects, a filament is formed by drawing a preform into a usably dimensioned filament. The filament is optionally formed using a draw tower to thermally draw preforms into a filament, illustratively by a process schematically depicted in FIG. 1C. A preform 2 is optionally itself printed using three dimensional printing processes on a three dimensional printer 1 as is readily commercially available. Once the preform is made and optionally fully assembled, it may be placed in a draw tower or other drawing apparatus for the production of a filament. The preform 2 (or 2') is placed into a draw tower 3 that includes feed mechanism for the preform 4, a heat source 5 and a take up spool 9 for collecting the formed filament 10. The preform 2 is preheated and then brought to full draw temperature in a draw tower 3 that includes a heating element 5 such as in the form of a clam shell oven. Shortly after heating and drawing, the filament optionally encounters a chilled coil 6 that quenches the filament to solidify it and prevent further drawing. Upon exiting the chiller, the filament diameter and draw tension are optionally measured using a filament diameter measurement system 7 and optionally a filament tension transducer 8 before the filament 10 is collected on a take-up spool 9. The preform may be fed into the heater at a very slow rate, controlled by a screw-driven linear actuator (exemplary feed mechanism 4), and the take-up speed may be controlled by a stepper motor on the take-up spool. The oven temperature, chiller position, feed rate, and take-up rate can all be adjusted to achieve different levels of filament size and quality.

As such, also provided are processes of forming a filament or of manufacturing an item using FFF technologies incorporating a filament with two or more filament materials differing in flow temperature by 10° C. or more. A process includes: additively manufacturing a first filament material and a second filament material; associating the first and the second filament materials optionally in a regular geometric arrangement to create a preform; heating the preform to a drawing temperature; and pulling the preform under tension to draw the preform down to a filament such that the regular geometric arrangement is preserved.

A first filament material is optionally an HFT filament material or an LFT filament material. A second filament material is optionally an HFT filament material or an LFT filament material. The first, second, or both filament materials are optionally formed by extrusion by processes known in the art, or by additive manufacturing such as by printing the individual filament materials in shapes that are complementary so as to be physically and mechanically associated, or are simultaneously printed in a regular geometric pattern to create a preform. Whether the first and second filament materials are formed together simultaneously or separately then physically associated, the shapes of the two (or more) filament materials are complementary so as to physically associate in the regular geometric arrangement.

A preform is optionally heated to a drawing temperature. A drawing temperature is a temperature at which both the filament materials are flowable meaning that a drawing temperature is at or above a flow temperature for the HFT filament material. A drawing temperature is optionally at the flow temperature for an HFT material. In some aspects, drawing at a minimum flow temperature, where the material is very viscous and drawing is performed under high tensile stress, may be used in order to accurately replicate the preform geometry in the final drawn filament with minimal relaxations or distortions due to gravity, surface tension, interfacial tension, or diffusion. A drawing temperature is optionally from equal to the flow temperature of the HFT material to 100° C. higher than the flow temperature of the HFT material.

The final filament is formed by pulling the preform when heated to the drawing temperature. The pulling is optionally under tension to draw the filament down to a cross sectional dimension that is lower than the cross sectional dimension of the preform, optionally 0.5× to 0.01× the cross sectional dimension of the preform. In all aspects, the geometric pattern of the preform is substantially maintained in the final filament whereby the relative arrangement, shapes and relative dimensions are preserved in the drawing process. In some aspects, the cross sectional shape of the preform is maintained, but is optionally changed such as from a polygon shape to a substantially circular or oval shape.

Also provided are processes of forming an article. A process optionally includes heating a filament at or above the flow temperature for the HFT material to form a heated filament, optionally reducing the diameter of the filament by extrusion, drawing or other suitable process, and depositing the heated filament in a controlled manner to form a three dimensional object. The shape of the object is not limited and may be in any shape such as that of a tool, medical device, toy, electronic device or any other shape. In some aspects, the three dimensional object is formed using computer control of the way the heated filament is layered in three dimensions. Computer control of such processes is known in the art as illustrated in U.S. Pat. No. 5,362,427.

The filament is optionally heated to the flow temperature of the HFT material, or a suitable temperature above the flow temperature of the HFT material, optionally from 1° C. to 300° C. above the flow temperature of the HFT material.

The combination of at least two filament materials in a geometric pattern, optionally an interlocking geometric pattern allows for exceptional FFF manufacturing methods to be achieved by promoting improved weldline characteristics as well as improved geometric stability of the resulting manufactured article. By varying the type of filament materials used, the overall characteristics such as electrical conductivity, optical properties, physical properties (e.g. hardness), and others can be readily tailored to the individual need of the user while promoting improved structures relative to those previously produced.

The technique of three dimensional (3D) printing a preform as described herein and drawing into a filament can be used to create logos, text, pictures, bar codes, and other geometrically complex identifiers that persist from the preform to the filament. This technique enables the encoding of such images into the core of a fiber in a way that would not otherwise be possible with conventional extrusion techniques due to the very small scale. Using 3D printing to create the preform also enables a high degree of customization, for example allowing a different bar code to be printed each day or each hour to create custom bar-coded filaments with short lead times. The small size of the filament and cross-section image provides a number of application possibilities. First, such a filament would be advantageous for anti-counterfeiting. A logo or code could be embedded in a filament that is then incorporated into the product, for example knitted into the body of an expensive sneaker or molded into the plastic housing of a critical electronic component. The embedded image would not be obvious to an outside viewer, so a counterfeit product would not be likely to replicate this feature. To check for the pedigree of a product, the original manufacturer would know to extract a certain fiber or cross-section the housing in a special location, and look in a microscope to see the embedded logo, image, or code. In a different application, filaments are produced with internal bar codes. The bar codes can be customized for each product run, or day of the week, or even a detail of that particular product. The filament is then included or embedded in the product, and provides a permanent physical record of the product information. A user or manufacturer can magnify and image the bar code, and scan it to retrieve relevant product information. Such a technique could similarly be used to embed a miniature QR code into a product, which could then be scanned by a user's mobile phone and used to reference a webpage with relevant product information.

The aforementioned technique of 3D printing a preform and drawing into filament can be used to create microfluidic fibers with internal flow channels for the transport of fluids or gasses. Such microfluidic fibers have application as medical microtubing for intravenous or catheter procedures where various medical agents are introduced via each channel to provide a multi-step treatment, and gas flow or vacuum can also be used to further provide physical action at the procedure site. A more complex medical fiber could also include optical waveguides along with microfluidic channels to provide directed light to the procedure site for activating materials or biological responses. Microfluidic fibers can also be used as heat and mass exchangers, for chemical processes or for active thermal management of materials or textiles.

The processes of 3D printing a preform and drawing into filament can be used to create electronically active materials. Applications include fibers that perform energy storage and release, such as: fuel cells, supercapacitors, capacitors, and batteries, including flow batteries; fibers that serve as conductors, coaxial fibers, inductors, or resistors; fibers that serve as sensors including but not limited to chemical, mechanical, and thermal sensors; fibers that can serve as actuators; and fibers that interact with radio frequency (RF) energy to serve as antennas or RFID structures. Such electronic fibers also provide important capabilities for smart textiles, wherein factors such as body temperature, sweat salinity, skin conduction, and muscle flexion are tracked or directly manipulated to monitor or improve user health and fitness.

The process of 3D printing a preform and drawing into filament can be used to create materials with tailored internal and external surface geometries. For example, a textured outer surface for controlled fluid wetting or controlled friction could be created in high detail by printing the geometry into a preform, and maintaining the geometry during drawing. Similarly, for internal features, a controlled internal surface geometry can be used to control flow wetting or to control optical properties such as internal light scattering.

The process of 3D printing a preform and drawing into filament can be used to print another preform, which is then drawn into filament and used again for printing. This process of repeated printing and drawing leads to a systematic and significant reduction in the internal material microstructure. For example, this approach can be used to create a "deterministic mixing" protocol for the combination of two or more materials. Consider a 10-mm-diameter preform that is printed with two different materials in a precise geometric relationship. Thermally drawing this preform into 1-mm-diameter filament, and then printing into 0.1-mm-diameter extrudate leads to a 100× reduction in the scale of the microstructure. If the extrudate is printed into a new 10-mm-diameter preform, that is again thermally drawn and extruded from a printer, there would be another 100× reduction in the microstructural scale. With just three cycles of printing and drawing, an original 10-mm material feature would be reduced to 10 nm. Moreover, because the thermal drawing and print extrusion processes are deterministic and generally affine, the mass and volume ratios of the two components should be nearly perfectly maintained at all scales. This process therefore allows for the assembly of 3D parts with perfectly homogenous distribution of two materials. In contrast, conventional compounding and molding processes often lead to internal gradients in structure and mixture ratio. The ability to tailor mixing deterministically could be important for a wide range of materials and applications, such selective diffusion membranes, pharmaceuticals, and propellants and explosives. This approach may also allow for fine-scaling mixing of incompatible (physical or chemical) materials that would otherwise not be mixable using conventional compounding equipment.

The process of 3D printing a preform and drawing into a filament could also include materials that are intended to be scavenged or otherwise dissolved away from the part. For example, PLA can be thermally or chemically decomposed in the presence of PC without a loss of PC. A preform could be created with both PC and PLA components. The preform could then be drawn into filament, and a subsequent chemical or thermal process used to remove the PLA while leaving the PC intact. This technique could be useful for supporting critical geometric features intact during drawing, such as open channels, finely-detailed features, sharp corners, or thin walls that might otherwise distort or collapse during drawing.

The processes of 3D printing a preform and drawing into filament are not limited to polymeric materials. Glasses are known to exhibit ideal Newtonian behavior, so the process of 3D printing and drawing glass bodies is realizable by substituting the thermoplastic materials as described herein with one or more glasses. Such filaments are ideally suited to waveguides, especially complex structured waveguides for tuned frequency guidance or for high powered lasers. Glass microfluidic fibers are useful for specialized heat and mass transfer applications where high temperatures are required. Metals can also be heated and drawn, and could be drawn in conjunction with other materials such as thermally compatible polymers and glasses. Bulk metallic glasses in particular are attractive due to their viscous flow behavior. Food products such as breads, sugars, cakes, and pastes could also be printed and drawn using this process.

Various aspects of the present invention are illustrated by the following non-limiting examples. The examples are for illustrative purposes and are not a limitation on any practice of the present invention.

EXAMPLES

Example 1

Figure 2B:
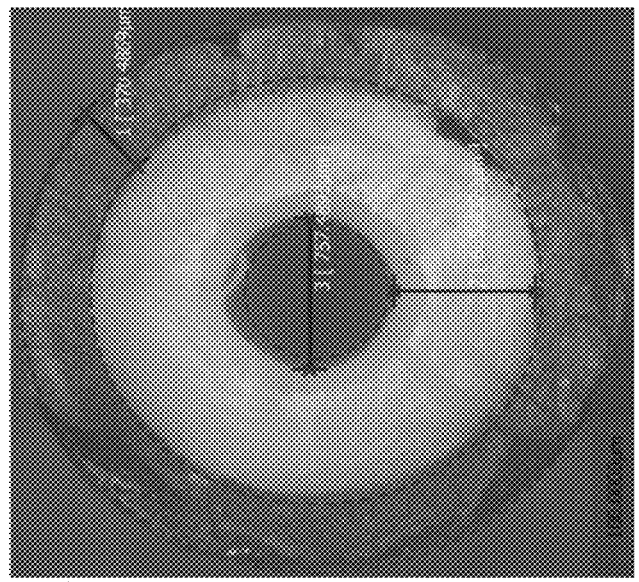
FIG. 2B is a photograph of the preform of FIG. 2A after drawing to a 2.5 mm outer diameter monofilament where the geometry and arrangement of the phases remained consistent with the original preform, with an approximately 10× reduction in scale.
Figure 2A:
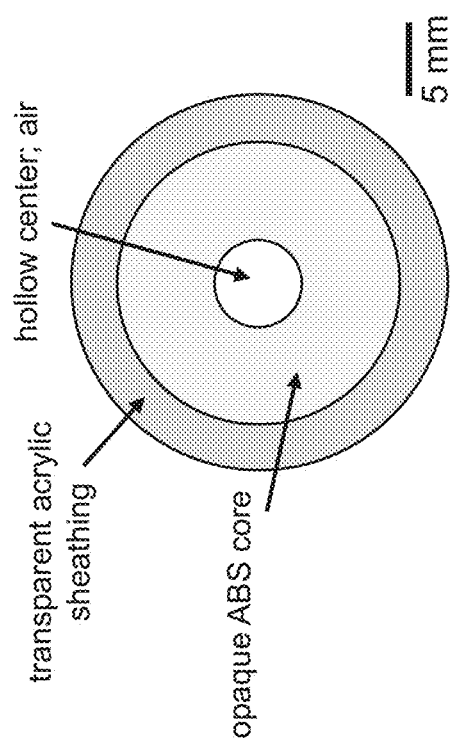
FIG. 2A is a schematic of a preform with a hollow, opaque printed ABS core and an outer, transparent sheath of extruded acrylic (poly(methyl methacrylate) (PMMA))

A preform is made using an acrylonitrile butadiene styrene (ABS) LFT polymer core with a glass transition temperature ($T_g$) of approximately 105° C., and extruded acrylic (PMMA) HFT polymer sheath with a $T_g$ of approximately 125° C. The source materials for the core were obtained from Stratasys (Eden Prairie, Minn.). The source materials for the extruded acrylic sheath is from McMaster Carr (Robbinsville, N.J.). The preform combines a printed ABS core made on a dual-head MAKERBOT REPLICATOR 2× (MAKERBOT Industries, LLC, Brooklyn, N.Y.) inserted within an extruded acrylic tube. The core was sized with some interference so that the fit into the sheath was mechanically tight. The resulting preform is illustrated in FIG. 2A. Thermally drawing this material resulted in monofilament such as shown in FIG. 2B, with an outer diameter of 2.5 mm while accurately replicating the original geometry of the preform. This example shows that dual materials can be co-drawn with this process, and that printed materials can be combined with conventionally extruded materials to create complex preforms. Furthermore, this example shows that hollow features can persist from perform to monofilament.

Example 2

Figure 3A:
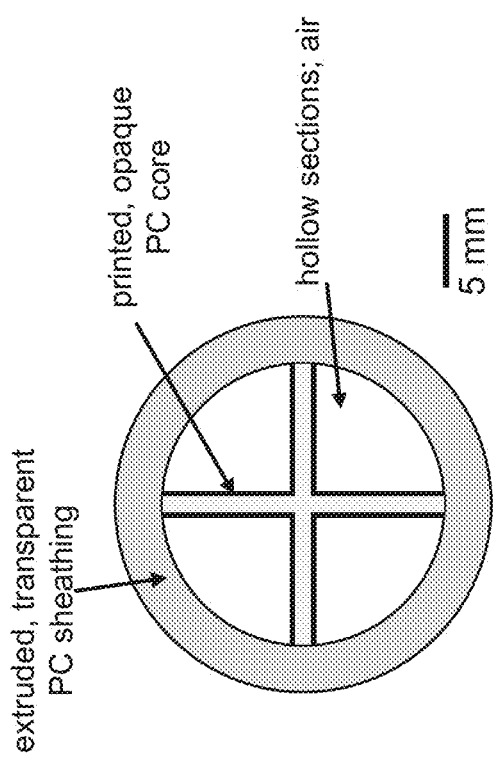
FIG. 3A is a schematic of a preform with an opaque, printed polycarbonate (PC) core in the shape of a complex cross pattern physically associated within an outer, transparent sheath of extruded PC.
Figure 3B:
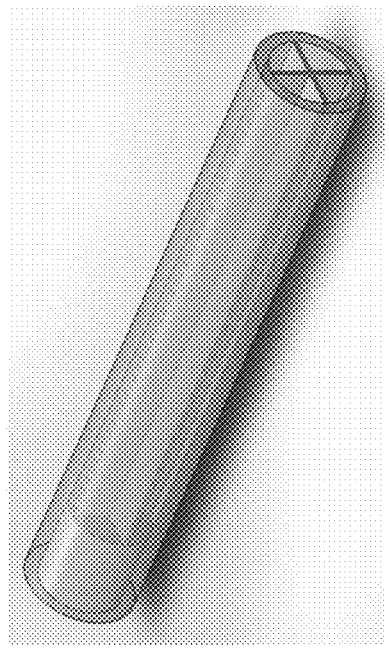
FIG. 3B illustrates a virtual rendition of a preform with a cross-section as shown in FIG. 3A FIG. 3C a photograph of the preform of FIG. 3A after drawing to an approximately 600 μm outer diameter monofilament where the geometry and arrangement of the phases remained consistent with the original preform, with an approximately 30× reduction in scale.

A preform is made using a printed polycarbonate (PC) core and an extruded polycarbonate tube. The source materials for the core were obtained from Stratasys (Eden Prairie, Minn.), while the extruded polycarbonate tubing is from McMaster Carr (Robbinsville, N.J.). The preform combines a printed PC core made on a Stratasys Fortus (Eden Prarier, Minn.) where the core includes a relatively complex cross shape that is maintained when inserted within an extruded PC tube. The resulting preform is illustrated in FIGS. 3A and B.

Figure 3D:
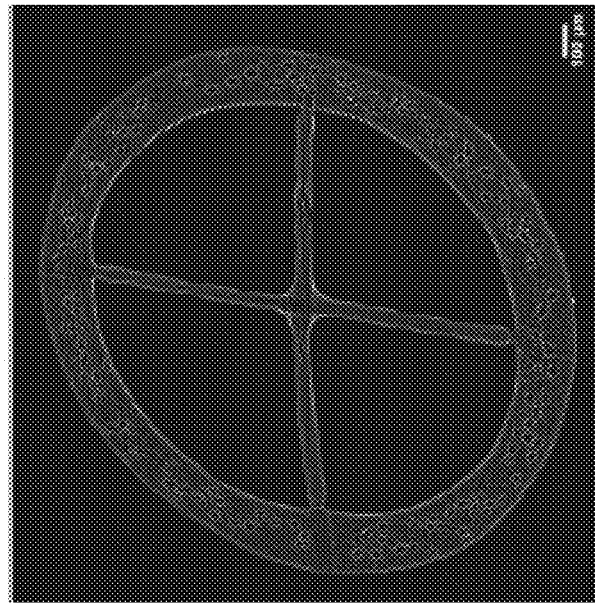
FIG. 3D a micrograph of the preform of FIG. 3A after drawing to an approximately 600 μm outer diameter monofilament where the geometry and arrangement of the phases remained consistent with the original preform, with an approximately 30× reduction in scale.
Figure 3C:
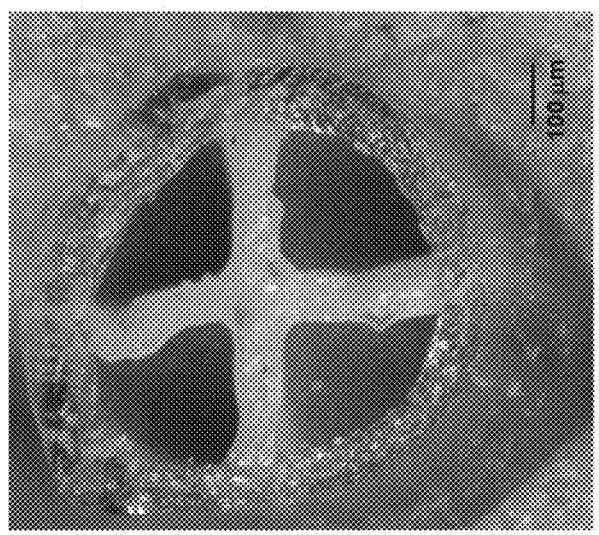

The preform is thermally drawn down to monofilament to create a four-lobed microfluidic fiber with opaque inner walls and an optically transparent outer wall such as shown in FIGS. 3C and 3D, with an outer diameter of approximately 600 μm while accurately replicating the original geometry of the preform. This example shows that dual materials can be co-drawn with this process while maintaining the shape of the original preform and relative dimensions thereof.

Figure 4A:
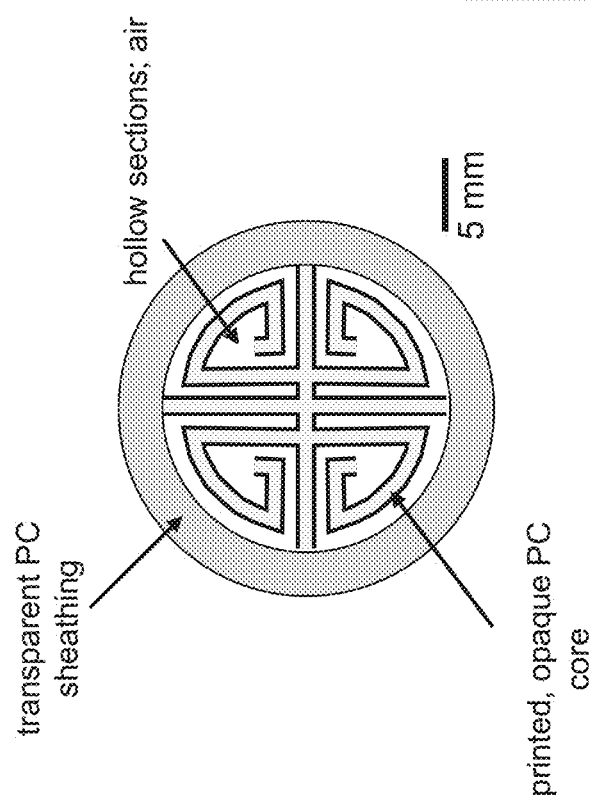
FIG. 4A is a schematic of a preform with a printed core of opaque PC in the shape of a complex interlocking pattern physically associated within an outer, transparent sheath of extruded PC.
Figure 4B:
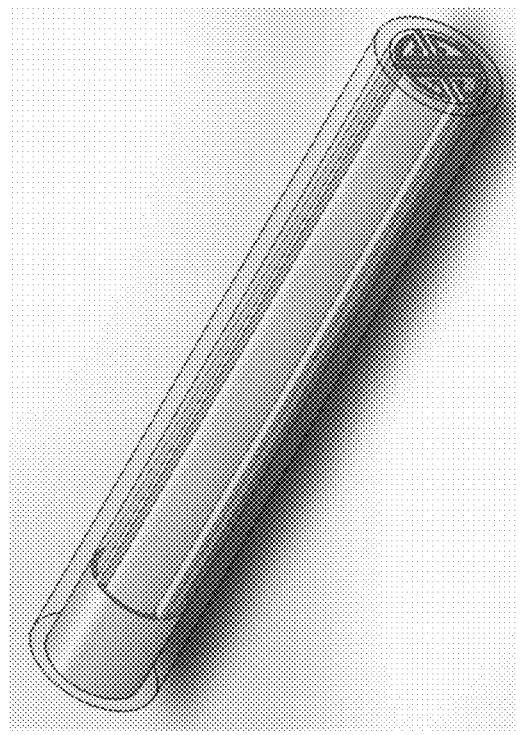
FIG. 4B illustrates a virtual rendition of a preform with a cross-section as shown in FIG. 4A.
Figure 4D:
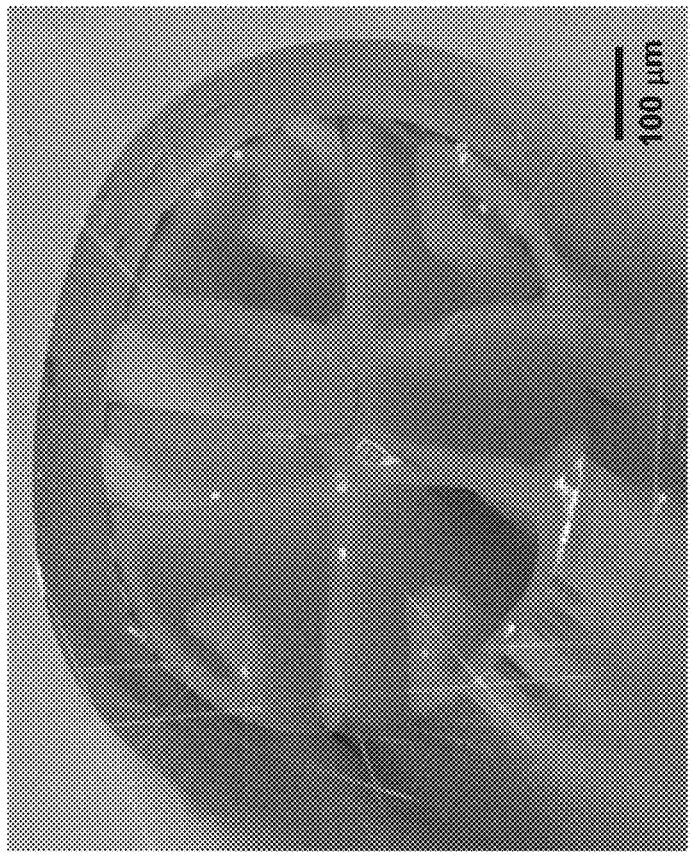
FIG. 4D is photograph of the preform of FIG. 4B after drawing to an approximately 800 μm outer diameter monofilament where the geometry and arrangement of the phases remained consistent with the original preform and showing reduction of 30× in scale.
Figure 4C:
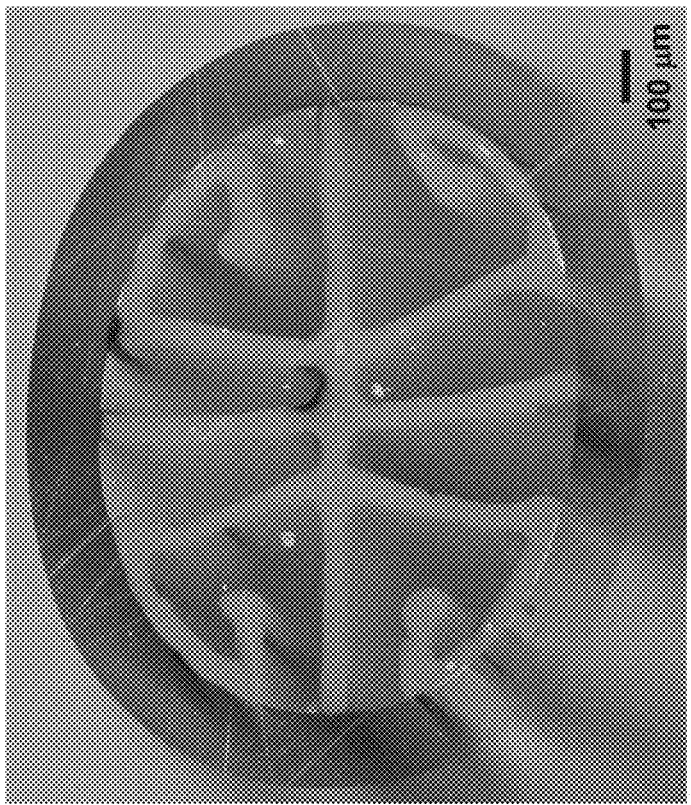
FIG. 4C is a photograph of the preform of FIG. 4B after drawing to an approximately 1.4 mm outer diameter where the geometry and arrangement of the phases remained consistent with the original preform and showing reduction of 17× in scale.

The same processes are used to form more highly complex structures as is illustrated in FIGS. 4A and B. The process produces a four-lobed, spiral-shaped, white, printed PC core is inserted into a transparent extruded PC sheath. The preform is drawn as in Example 1 into a monofilament that, while not a perfect replicate of the original preform, captures the relevant features including multiple flow channels and cantilevered internal wall structures as illustrated in FIGS. 4C and D.

Example 3

Complex interlocking preforms are produced by independently printing by FFF processes two independent interlocking shapes, the LFT polymer is ABS with a glass transition temperature ($T_g$) of approximately 105° C., and the HFT polymer is polycarbonate (PC) with a $T_g$ of approximately 147° C. The individual polymer shapes are printed using a Stratasys Fortus (Eden Prarier, Minn.). The two components were sized with some interference so that the fit when combined was mechanically tight. The two components are fit together to produce the preform as illustrated in FIG. 5A illustrating the two elements in an intermediately combined state.

Figure 5B:
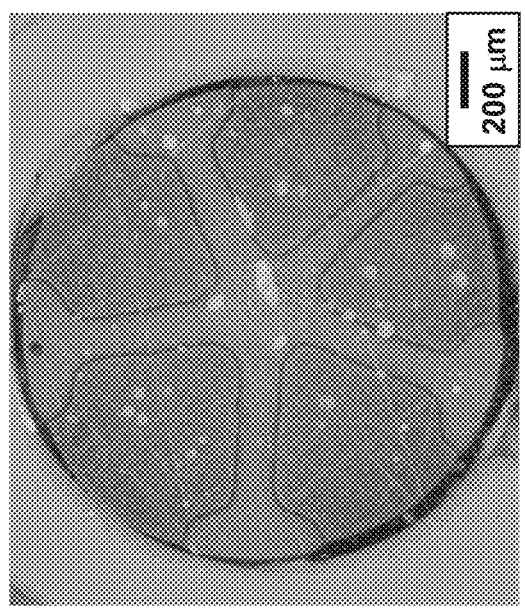
FIG. 5B is a micrograph of the preform of FIG. 5A after drawing to a 1.59 mm outer diameter filament where the geometry and arrangement of the phases remained consistent with the original preform.
Figure 5A:
FIG. 5A illustrates regular geometric arrangements of an ABS polymer (gray) as being combined with a PC polymer (white) illustrating an arrangement during the sliding of the PC material into the ABS material following independent manufacture by printing.
Figure 5D:
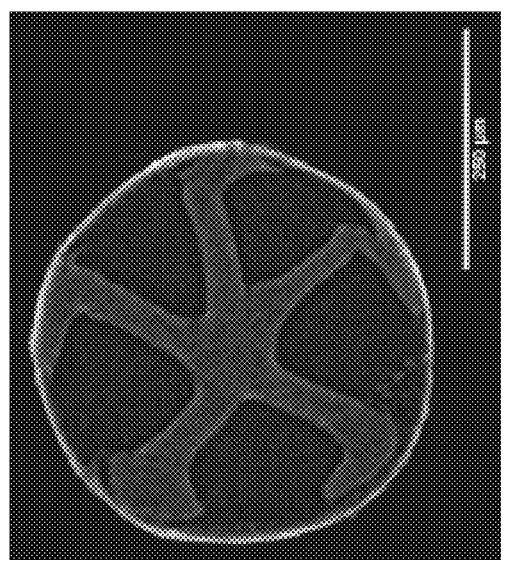
FIG. 5D is a micrograph of the preform of FIG. 5A after extrusion from an FFF print heat, resulting in an approximately 400 μm outer diameter filament where the geometry and arrangement of the phases remained consistent with the original preform and monofilament used as feedstock.
Figure 5C:
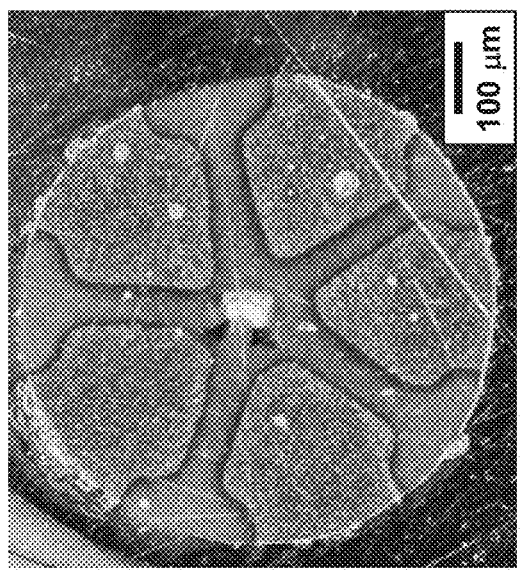
FIG. 5C is a micrograph of the preform of FIG. 5A after drawing to a 0.65 mm outer diameter filament where the geometry and arrangement of the phases remained consistent with the original preform.

The preform is thermally drawn down to a five-lobed monofilament with interlocking polymers as shown in FIG. 5B, with an outer diameter of approximately 1.6 mm while accurately replicating the original geometry of the preform. The preform is thermally drawn to a finer scale, five-lobed filament with interlocking polymers as shown in FIG. 5C, with an outer diameter of approximately 0.65 mm while accurately replicating the original geometry of the preform.

Figure 5E:
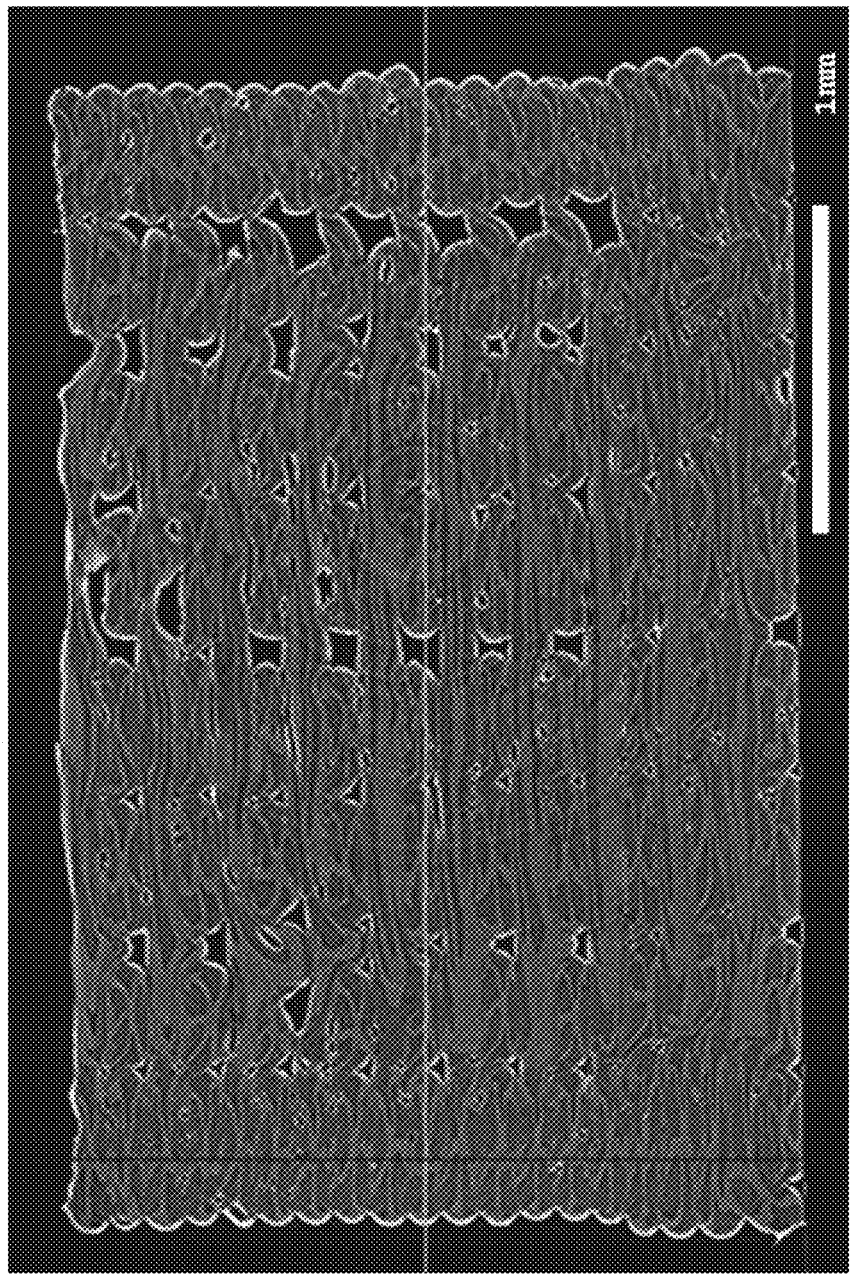
FIG. 5E depicts an exemplary printed article formed by a three dimensional printing process using a filament as a feedstock.

The filament is used as a feedstock in a dual-head MAKERBOT REPLICATOR 2× (MAKERBOT Industries, LLC, Brooklyn, N.Y.) and a single material line is printed. The resulting monofilament is sectioned and analyzed as illustrated in FIG. 5D. The major features of the original preform and monofilament are replicated during FFF printing, in this case down to a diameter of 0.4 mm. A full part was printed from this feedstock and sectioned, FIG. 5E. The geometric features of the original feedstock persist into the printed body.

The same monofilament is used in the MAKERBOT printer to print a three dimensional structure in the shape of ASTM D38-IV dogbone missing one of the gripping ends and reduced to half its dimensions about its centroid. An identically shaped and sized structure is printed on the same printer using only the ABS material. The two structures are then positioned adjacent to one another in an enclosed thermal chamber with a transparent façade. A video recording device is normally positioned at an approximately similar elevation to the two printed structures. The thermal enclosure is set to 180° C. and as the temperature rises in the chamber the response of the printed structures is continuously recorded. After an hour at 180° C., the test is concluded. Examination of the recorded images revealed that at a temperature of 168° C., the dogbones printed with ABS-only droop significantly under their weight, while the dogbones printed using ABS+PC dual material monofilament are geometrically stable.

Example 4

Figure 6A:
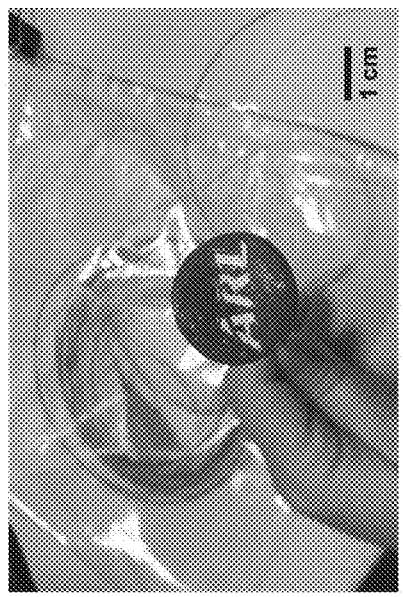
FIG. 6A illustrates regular geometric arrangements of different colored ABS polymers in the shape of the corporate logo for the Army Research Laboratory (ARL)
Figure 6D:
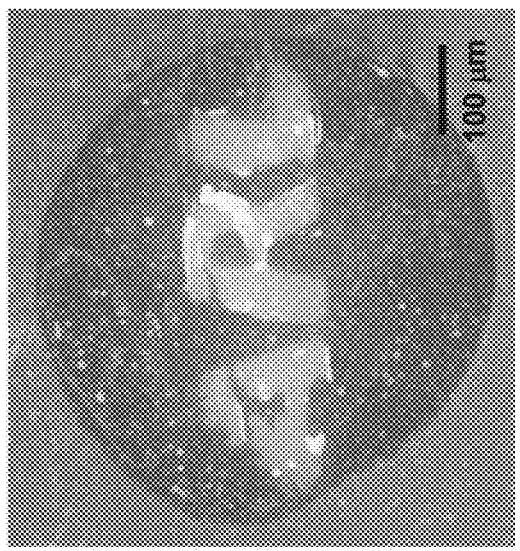
FIG. 6D shows a photograph of a preform with a cross section of the ARL logo after thermal drawing to a 0.52 mm diameter fiber and showing a 49× reduction in scale.
Figure 6C:
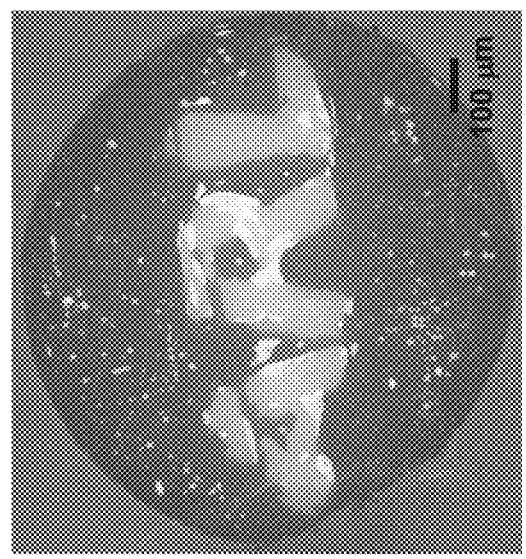
FIG. 6C shows a photograph of a preform with a cross section of the ARL logo after thermal drawing to a 0.95 mm diameter fiber and showing a 27× reduction in scale.
Figure 6B:
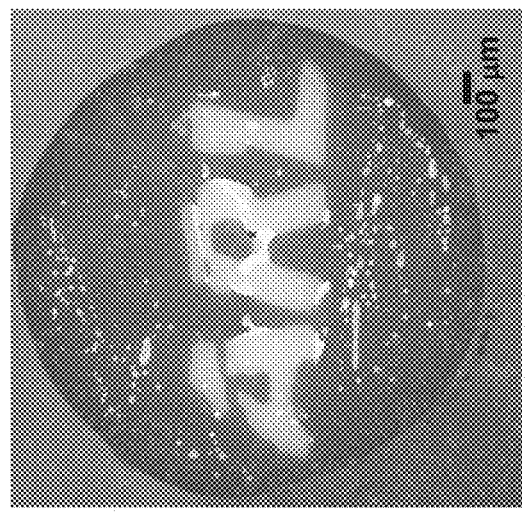
FIG. 6B shows a photograph of a preform with a cross section of the ARL logo after thermal drawing to a 1.5 mm diameter fiber and showing a 17× reduction in scale.

A combined and interconnected preform is created by printing two differently colored ABS materials into a single preform using the dual-head MAKERBOT REPLICATOR 2×, where the printed materials form a corporate logo for the Army Research Laboratory. A preform is illustrated in FIG. 6A. Drawing the preform as in Example 3 to monofilament demonstrates that the logo is reproduced with fidelity at diameters of 1.5 mm as illustrated in FIG. 6B, with smaller diameters possible and illustrated in FIGS. 6C (0.95 mm diameter) and D (0.52 mm diameter). The example shows how one can create a fiber with a logo, special symbol, or information barcode that would be very small in size and only evident if examined with a microscope. Such a fiber could be very useful for branding, labeling, or anti-counterfeit/anti-tamper applications.

Various modifications of the present invention, in addition to those shown and described herein, will be apparent to those skilled in the art of the above description. Such modifications are also intended to fall within the scope of the appended claims.

Patents, publications, and applications mentioned in the specification are incorporated herein by reference to the same extent as if each individual patent, publication, or application was specifically and individually incorporated herein by reference.

The foregoing description is illustrative of particular aspects of the invention, but is not meant to be a limitation upon the practice thereof. The following claims, including all equivalents thereof, are intended to define the scope of the invention.

We claim:

1. A process for creating a polymer filament suitable for use in three-dimensional printing, said process comprising:
   associating a first thermoplastic polymer and a second thermoplastic polymer in a regular geometric arrangement to create a preform;
   heating said preform to a drawing temperature;
   pulling said preform under tension to draw said preform down to a filament such that said regular geometric arrangement is preserved
   and further comprising the step of manufacturing said first thermoplastic polymer, said second thermoplastic polymer, or both by three-dimensional printing.

2. The process of claim 1, in which said preform has a diameter of 1-1000 millimeters.

3. The process of claim 1, wherein said filament has a filament diameter of 0.01-100 millimeters.

4. The process of claim 1, wherein a flow temperature of said first thermoplastic polymer is 10 degrees Celsius or more higher than a flow temperature of said second thermoplastic polymer.

5. The process of claim 1, wherein said first thermoplastic polymer is a single continuous body throughout a preform cross-section.

6. The process of claim 1, wherein a geometry of said first thermoplastic polymer at least partially confines said second thermoplastic polymer so that said second thermoplastic polymer cannot freely release from a filament structure.

7. A process for creating a polymer filament suitable for use in three-dimensional printing, said process comprising:
associating a first thermoplastic polymer and a second thermoplastic polymer in a regular geometric arrangement to create a preform;
heating said preform to a drawing temperature;
pulling said preform under tension to draw said preform down to a filament such that said regular geometric arrangement is preserved
where said first thermoplastic polymer, said second thermoplastic polymer, or both comprise one or more of a thermoplastic material selected from the group consisting of: PLA, ABS, PC, or nylon.

8. A process for creating a polymer filament suitable for use in three-dimensional printing, said process comprising:
associating a first thermoplastic polymer and a second thermoplastic polymer in a regular geometric arrangement to create a preform;
heating said preform to a drawing temperature;
pulling said preform under tension to draw said preform down to a filament such that said regular geometric arrangement is preserved
wherein said regular geometric arrangement is a periodic geometric arrangement.

9. A process for creating a polymer filament suitable for use in three-dimensional printing, said process comprising:
associating a first thermoplastic polymer and a second thermoplastic polymer in a regular geometric arrangement to create a preform;
heating said preform to a drawing temperature;
pulling said preform under tension to draw said preform down to a filament such that said regular geometric arrangement is preserved
where at least a portion of said first thermoplastic polymer and said second thermoplastic polymer is present on an outer surface of said preform.

10. The process of claim 9, where the proportions of the outer surface in which each polymer is present are approximately equal and spaced periodically.

11. The process of claim 1, wherein said preform comprises a cross-sectional shape that varies non-randomly along a length of said preform.

12. A process for creating an article, said process comprising:
associating a first thermoplastic polymer and a second thermoplastic polymer in a regular geometric arrangement to create a preform;
heating said preform to a drawing temperature;
pulling said preform under tension to draw said preform down to a filament such that said regular geometric arrangement is preserved;
heating said filament to form a heated filament; and
depositing said heated filament to build a three dimensional object.

13. The process of claim 12, further comprising subjecting said three dimensional object to a temperature sufficient for annealing to improve the physical cohesion between printed polymer lines and layers.

14. The process of claim 13, in which said elevated temperature is lower than a flow temperature of a highest flow temperature polymer in the preform, but higher than a flow temperature of a lowest flow temperature polymer in the preform.

15. The process of claim 7, in which said preform has a diameter of 1-1000 millimeters.

16. The process of claim 7, wherein said filament has a filament diameter of 0.01-100 millimeters.

17. The process of claim 7, wherein a flow temperature of said first thermoplastic polymer is 10 degrees Celsius or more higher than a flow temperature of said second thermoplastic polymer.

18. The process of claim 7, wherein said first thermoplastic polymer is a single continuous body throughout a preform cross-section.

19. The process of claim 7, wherein a geometry of said first thermoplastic polymer at least partially confines said second thermoplastic polymer so that said second thermoplastic polymer cannot freely release from a filament structure.

20. The process of claim 7, wherein said preform comprises a cross-sectional shape that varies non-randomly along a length of said preform.

21. The process of claim 8, in which said preform has a diameter of 1-1000 millimeters.

22. The process of claim 8, wherein said filament has a filament diameter of 0.01-100 millimeters.

23. The process of claim 8, wherein a flow temperature of said first thermoplastic polymer is 10 degrees Celsius or more higher than a flow temperature of said second thermoplastic polymer.

24. The process of claim 8, wherein said first thermoplastic polymer is a single continuous body throughout a preform cross-section.

25. The process of claim 8, wherein a geometry of said first thermoplastic polymer at least partially confines said second thermoplastic polymer so that said second thermoplastic polymer cannot freely release from a filament structure.

26. The process of claim 8, wherein said preform comprises a cross-sectional shape that varies non-randomly along a length of said preform.

27. The process of claim 9, in which said preform has a diameter of 1-1000 millimeters.

28. The process of claim 9, wherein said filament has a filament diameter of 0.01-100 millimeters.

29. The process of claim 9, wherein a flow temperature of said first thermoplastic polymer is 10 degrees Celsius or more higher than a flow temperature of said second thermoplastic polymer.

30. The process of claim 9, wherein said first thermoplastic polymer is a single continuous body throughout a preform cross-section.

31. The process of claim 9, wherein a geometry of said first thermoplastic polymer at least partially confines said second thermoplastic polymer so that said second thermoplastic polymer cannot freely release from a filament structure.

32. The process of claim 9, wherein said preform comprises a cross-sectional shape that varies non-randomly along a length of said preform.

* * * * *